United States Patent
Jones

(10) Patent No.: US 7,934,104 B2
(45) Date of Patent: Apr. 26, 2011

(54) SYSTEMS AND METHODS FOR VERIFYING A LICENSED INSTALLATION AT TIME OF UPDATE

(75) Inventor: Phillip David Jones, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 11/339,604

(22) Filed: Jan. 25, 2006

(65) Prior Publication Data
US 2007/0174635 A1    Jul. 26, 2007

(51) Int. Cl.
G06F 11/30 (2006.01)
G06F 7/04 (2006.01)
H04L 9/32 (2006.01)
G06F 21/22 (2006.01)
G06F 9/445 (2006.01)
G06F 1/00 (2006.01)
G06Q 99/00 (2006.01)

(52) U.S. Cl. ........... 713/189; 713/176; 713/187; 726/26
(58) Field of Classification Search .................. 713/189, 713/176, 187; 726/26
See application file for complete search history.

(56) References Cited

U.S. PATENT DOCUMENTS

| | | | |
|---|---|---|---|
| 5,675,645 A | * | 10/1997 | Schwartz et al. ............. 713/187 |
| 5,805,699 A | * | 9/1998 | Akiyama et al. ............... 713/176 |
| 5,991,405 A | | 11/1999 | Mills |
| 6,574,657 B1 | | 6/2003 | Dickinson |
| 2003/0081787 A1 | | 5/2003 | Kallahalla et al. |
| 2003/0163712 A1 | * | 8/2003 | LaMothe et al. .............. 713/189 |
| 2004/0151310 A1 | | 8/2004 | Fu et al. |
| 2005/0018842 A1 | | 1/2005 | Fu et al. |
| 2005/0055686 A1 | | 3/2005 | Buban et al. |

FOREIGN PATENT DOCUMENTS

WO    WO 2007132474 A2 * 11/2007

OTHER PUBLICATIONS

Ganesh Vaidyanathan, Steven Mautone, "Security in dynamic web content management systems applications", Dec. 2009, Communications of the ACM, vol. 52 Issue 12, Publisher: ACM, pp. 121-125.*

* cited by examiner

*Primary Examiner* — Matthew B Smithers
*Assistant Examiner* — Courtney D Fields
(74) *Attorney, Agent, or Firm* — Cynthia G. Seal; Schubert Law Group PLLC

(57) ABSTRACT

Systems, methods and media for verifying the existence of a licensed software installation at the time of an update to the software are disclosed. In one embodiment, a package of files for the update is encrypted with a copy of a key file that is contained in the original installation. The encrypted package of files is stored at a remote location that is accessible by way of a website. When a user seeks to download an update, the user must provide a copy of the key file used to encrypt the data. The user-provided key file is then used to decrypt the encrypted package.

20 Claims, 5 Drawing Sheets

SYSTEMS AND METHODS FOR VERIFYING A LICENSED INSTALLATION AT TIME OF UPDATE

FIELD

The present invention is in the field of computer software updates. More particularly, the invention relates to verifying the existence of a valid software installation at the time of updating the software.

BACKGROUND

Many different types of computing systems have attained widespread use around the world. These computing systems include personal computers, servers, mainframes, work stations, and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, web-publishing, databases, and accounting. Further, networks enable high speed communication between people in diverse locations by way of e-mail, websites, instant messaging, and web-conferencing.

At the heart of every computer, server, workstation and mainframe is a microprocessor. A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, a computer will have a processor for executing operating system software and applications software. This software is stored electronically on a hard drive of the computer. Almost all software installed in the field, including operating system software, requires periodic updates to the software to be installed. These patch updates are distributed by the developer of the original software to provide bug fixes and enhancements to the original product. The original software is purchased with a license by a customer. The original software may be sold by download from a website making payment by credit card, or may be purchased on a disk at a local store. In contrast, updates to the original software installation are distributed freely by way of a website posted by the developer. Thus, a user may go to a website of a developer and select from a plurality of available updates for download. By pressing a download key, the software update package of updated files is downloaded to the requesting computer. For example, updates to the Microsoft® Windows® operating system comprise update packages, a package normally consisting of only those files which have changed from the original version. The changed files are individually updated.

For the Linux operating system, however, the standard software delivery and installation mechanism is by way of Red hat Package Manager (RPM) files. The RPM provides no mechanism for updating individual files without causing the RPM utilities to give errors in typical management functions such as verifying the integrity of the installed software. Rather, the RPM provides all the software files as an entire re-installation. If the product is to be distributed to only licensed users, this prevents the RPM from being posted on a freely available website, because anyone with access could install and use the product unlicensed.

One known solution to this problem is to encrypt the update with a random encryption and to perform a key exchange with the licensed user. This solution requires that all customers who purchased the original product be tracked in a database, and then using this database to notify the licensed customer in a secure manner of the update and the required decryption key. Clearly, this solution requires extensive administrative overhead. And, the solution is only viable if a licensed user tracking process is in place when the product is first released.

What is needed is an update method that verifies the existence of an installation when a user selects to update.

SUMMARY

The problems identified above are in large part addressed by systems, methods and media for using encryption to update installed computer program files. One embodiment is a method for updating a computer user's computer program using encryption. The method comprises providing an encrypted update package of files encrypted using a copy of a key file contained in an original version of the computer program to produce a scrambled package of files. The method also comprises decrypting the encrypted update package using a user-provided key file in response to a user request for an update.

Embodiments include a computer configurable to perform installation of a computer program update package of files. The embodiment comprises memory to store instructions to decrypt an encrypted update package of files that is encrypted with a copy of a key file contained in a previous version of the computer program. The embodiment also comprises a processor to execute instructions to install files of the update package. The instructions comprise retrieving a user key file from a memory of a computer of a user seeking installation of the update package. The instructions further comprise decrypting the encrypted update package of files using the retrieved user key file to produce an unencrypted update package of files. Embodiments may further comprise evaluation of data bits to determine error.

Another embodiment of the invention provides a machine-accessible medium containing instructions effective, when executing in a data processing system, to cause the system to perform a series of operations for performing software updates. The series of operations comprise receiving data of an encrypted update package of files that has been encrypted using a copy of a key file contained in an original version of the computer program. The operations further comprise decrypting the encrypted update package of files using a user-provided key file in response to a user request for an update.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for verifying the existence of a licensed software installation at the time of an update to the software are disclosed. In one embodiment, a package of files for the update is encrypted with a copy of a key file that is contained in the original installation. The encrypted package of files is stored at a remote location that is accessible by way of a website. When a user seeks to download an update, the user must provide a copy of the key file used to encrypt the data. The user-provided key file is then used to decrypt the encrypted package.

Figure 1:
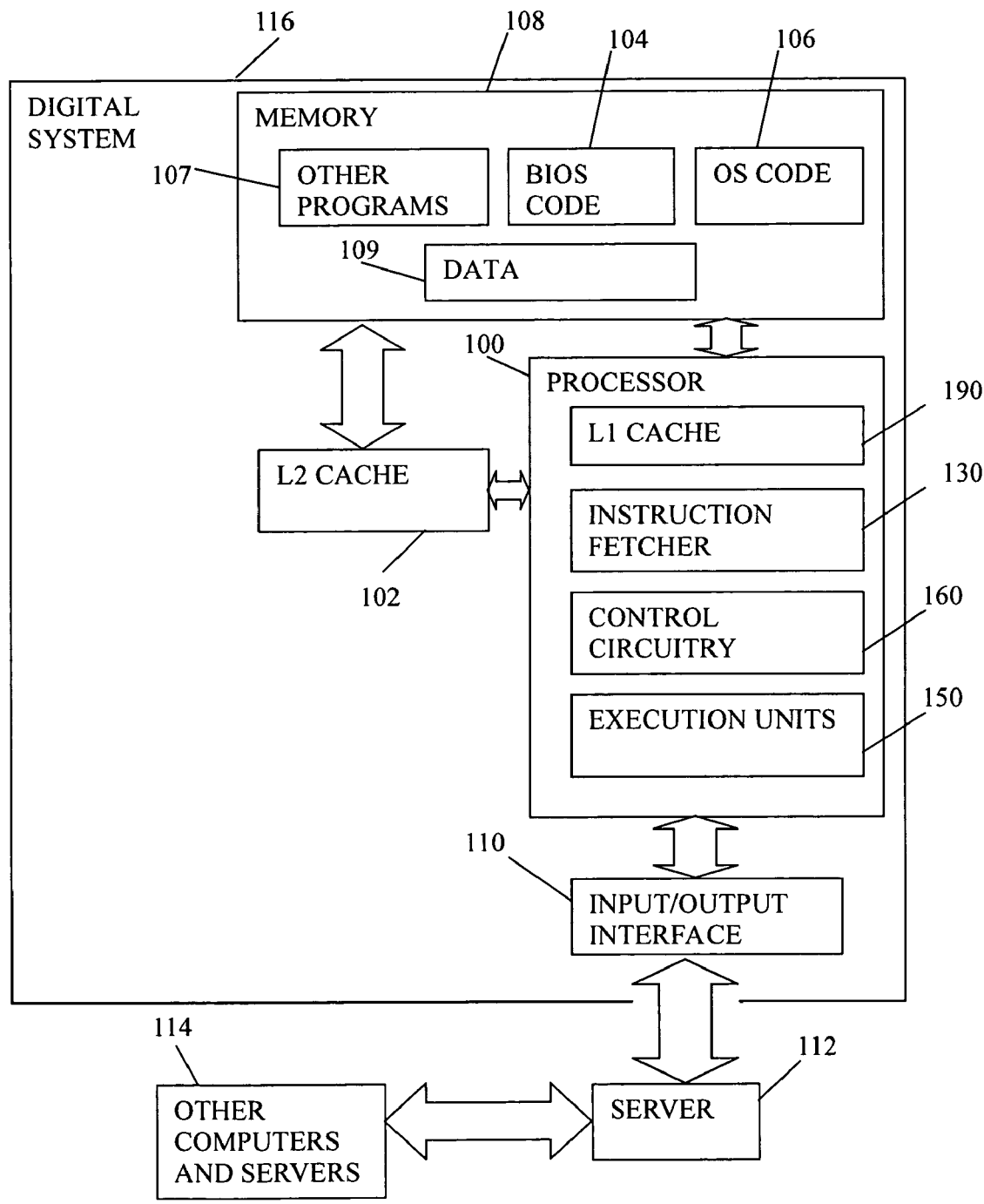
FIG. 1 depicts an embodiment of a digital system within a network; within the digital system is a processor.

FIG. 1 shows a digital system 116 such as a computer or server implemented according to one embodiment of the present invention. Digital system 116 comprises a processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of computer system 116. Digital system 116 comprises a level 2 (L2) cache 102 located physically close to processor 100. Memory 108 also stores other programs for execution by processor 100 and stores data 109. In an embodiment, memory 108 stores computer code to perform updates of software, as will be described herein.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Digital system 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet. Further, server 112 may control access to other memory comprising tape drive storage, hard disk arrays, RAM, ROM, etc.

Thus, in one mode of operation of digital system 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Each of the units may be adapted to execute a specific set of instructions. Instructions can be submitted to different execution units for execution in parallel. In one embodiment, two execution units are employed simultaneously to execute certain instructions. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

Figure 1A:
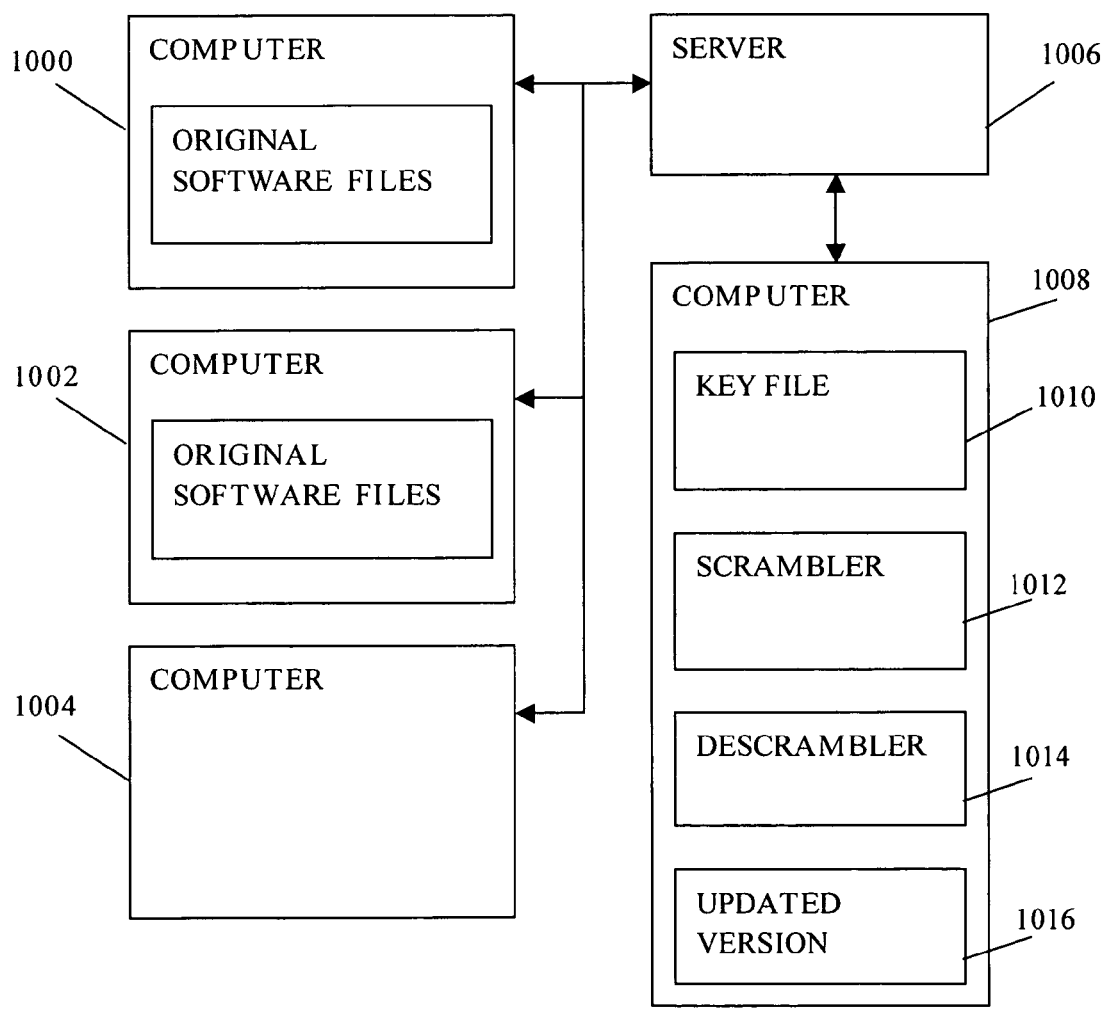
FIG. 1A depicts a block diagram of an embodiment for updating software from a secure location.

The processor of FIG. 1 within a computer such as system 116 can execute software to update a software package installed in memory and verify the validity of software installed on the computer before downloading an updated version of software from a server site. The update software package is a set of files to replace files of the original or previous installation. The update package is provided from a host site accessible by a user by way of a server. The server facilitates and coordinates communications between the computers in the network. This is shown in FIG. 1A. Each of a plurality of computers 1000, 1002, 1004, 1008 has its own memory for storing its operating system, BIOS, and the code for executing application programs, as well as files and data. The memory of a computer comprises Read-Only-Memory (ROM), cache memory implemented in DRAM and SRAM, a hard disk drive, CD drives and DVD drives. The server 1006 also has its own memory and may control access to other memory such as tape drives and hard disk arrays. Each computer may store and execute its own application programs. Some application programs, such as databases, may reside in the server. Thus, each computer may access the same database stored in server 1006. In addition, each computer may access other memory by way of server 1006.

Thus, a server may be in communication with a large number of computers of a network such as the Internet, or a local intra-net, or a combination of both. One or more computers 1000, 1002 may have installed an original software package with files containing only the original content supplied by the distributor of the software package. Computer 1008 stores an updated version 1016 of the software package. Updated version 1016 comprises files that have changed since the original package was distributed to computers 1000, 1002. One of the original files that is not changed is used as a key file 1010. A copy of key file 1010 is used by a scrambler 1012 to encode or scramble the updated version 1016 of the software. This may be done by performing an exclusive-or (XOR) between the contents of the key file and the contents of updated version 1016. Scrambler 1012 outputs a scrambled version of the updated file 1016.

This scrambled version can be descrambled by descrambler 1014 only if the user can provide a copy of key file 1010. The user can do this if his or her computer contains the original software installation, since the key file does not change, and is part of the original installation. Thus, the user of computer 1000 or computer 1002, which has the original files, including the key file, will be able to accomplish an update. The user of computer 1004 that does not have the original files, which contains the key file, cannot download the update because he or she cannot provide the key file for descrambling the scrambled version of the update.

In one embodiment, therefore, prior to making a download available to authorized users, the system will scramble the files of the update package by performing an exclusive-or operation between the key file and the unscrambled update files. The scrambled file is then available for updating the user's software provided the user has a copy of the key file to descramble the scrambled file. The system descrambles the scrambled file by performing an exclusive-or operation between the user's copy of the key file and the scrambled file. This methodology takes advantage of a logical property of the exclusive-or function:

If $A(\text{xor})C=B$, then $B(\text{xor})C=A$, where A is the unscrambled file, C is the key file, and B is the scrambled file. Note that the first exclusive-or operation is performed in advance of making the update available to users by way of download. This is performed in computer 1008. Thus, computer 1008 has software executable by its processor to cause the processor to perform the first exclusive-or operation. The second exclusive-or operation is performed at the time of update. A user without a key file can, at most, access the scrambled update file, but cannot unscramble it.

In one embodiment, the unscrambling step is performed in computer 1008. In this embodiment, at the time of update, the user's copy of the key file is transferred from the user's computer 1000 by way of server 1006 to computer 1008. Computer 1008 unscrambles the scrambled update package using the key file transferred to it and sends the unscrambled files only, to computer 1000 by way of server 1006. Computer 1008, thus, has update software to configure the computer processor of computer 1008 to execute the descrambling of the scrambled file. Note that the user need not know which file is the key file. Therefore, which of the files of the original installation is the key file is kept secret by the developer distributing the update. Thus, in one embodiment, computer 1008 initiates a command to the requesting computer, causing the requesting computer to send a copy of the file designated by computer 1008. The system does not disclose which file is designated, and thus, the user does not know which file was selected as the key file.

In another embodiment, the unscrambling step is performed in the user's computer. In this embodiment, at the time of an update request, user computer 1000 downloads the scrambled file from computer 1008 by way of server 1006. Computer 1000 then unscrambles the downloaded scrambled file using the copy of the key file previously installed on computer 1000. Computer 1000, thus, has update software to configure the computer processor of computer 1000 to execute the descrambling of the received scrambled file. Once again, the identity of the key file can be kept secret from the requesting user, although not secret to the user's computer.

Figure 2:
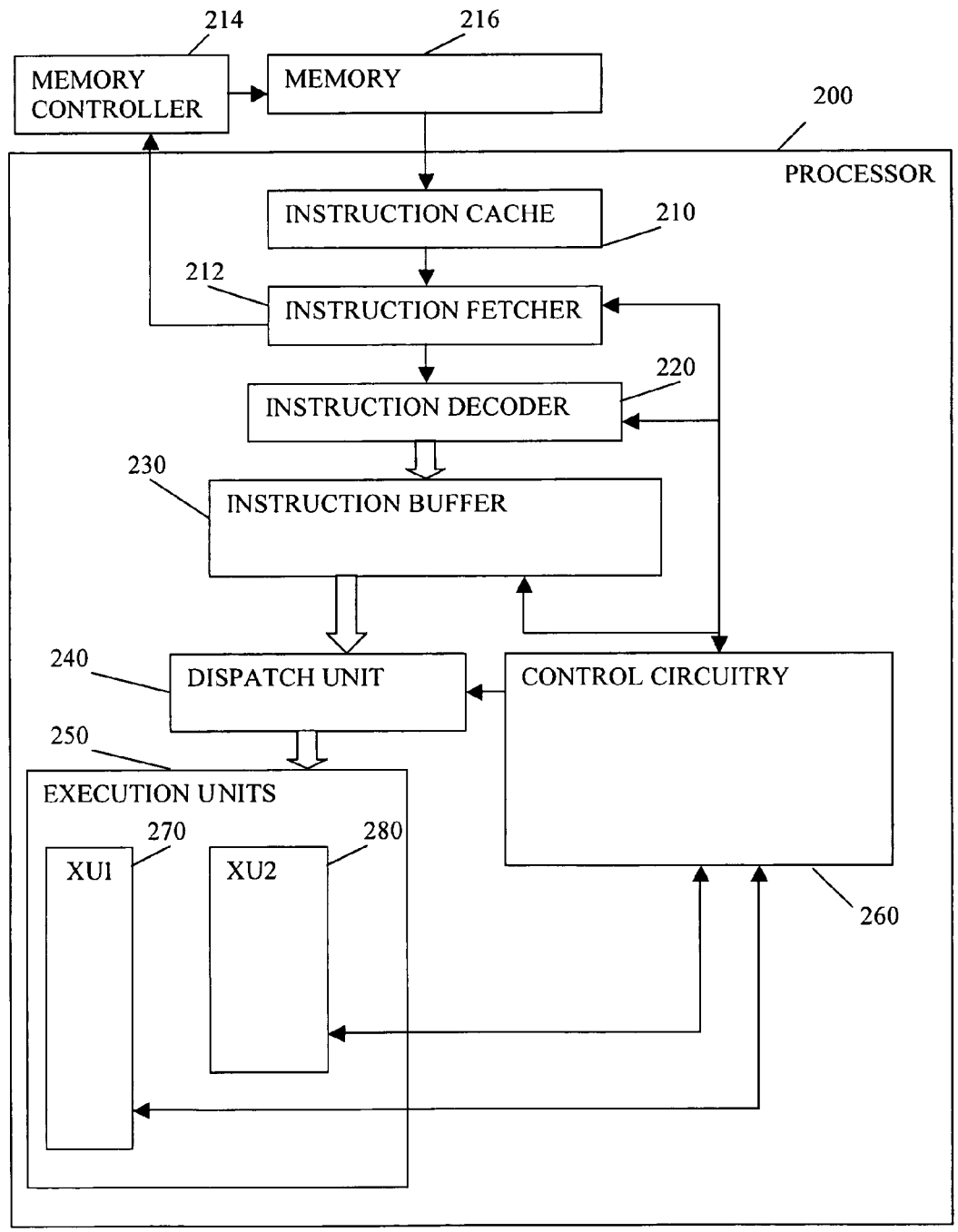
FIG. 2 depicts an embodiment of a processor within a computer that may be configured to encrypt and/or decrypt an update software package.

FIG. 2 shows an embodiment of a processor 200 that can be implemented in a digital system such as digital system 116 or server 1006 or computers 1000, 1002, 1004, and 1008 to execute update software as described herein. The processor 200 of FIG. 2 is configured to execute instructions of update to provide the functionality depicted in FIG. 1A. A level 1 instruction cache 210 receives instructions from memory 216 external to the processor, such as level 2 cache. Thus, software for performing updates may be stored in memory as an application program. Groups of sequential instructions of the software for performing updates can be transferred to the L2 cache, and subgroups of these instructions can be transferred to the L1 cache.

An instruction fetcher 212 maintains a program counter and fetches software update instructions from L1 instruction cache 210. The program counter of instruction fetcher 212 comprises an address of a next instruction to be executed. Instruction fetcher 212 also performs pre-fetch operations. Thus, instruction fetcher 212 communicates with a memory controller 214 to initiate a transfer of software update instructions from a memory 216 to instruction cache 210. The place in the cache to where an instruction is transferred from system memory 216 is determined by an index obtained from the system memory address.

Sequences of instructions are transferred from system memory 216 to instruction cache 210 to implement software update functions. For example, a sequence of instructions may instruct processor 200 to receive into its registers the data of a key file and the data of a scrambled file. Both data are received from a data cache in processor 200 (not shown). More particularly, the processor follows instructions to transfer data of a key file from memory into its data cache, and from there, into registers of the processor. Then, processor 200 follows instructions to, for example, perform the exclusive-or of a word or byte of key file data with a word or byte of scrambled file data. Only if the right key file is used will the processor output byte by byte or word by word the unscrambled files.

Thus, processor 200 performs an exclusive-or between the key file and each separate file of the total of all files in the scrambled version. If a file of the total of files is longer than the key file, the unscramble program will reuse bits from the beginning of the key file. The same bits are reused in the same way during scrambling prior to any updates. Note also, that an embodiment may comprise the use of extra data such as file identification data, parity data and error checking data.

Instruction fetcher 212 retrieves software update instructions passed to instruction cache 210 and passes them to an instruction decoder 220. Instruction decoder 220 receives and decodes the instructions fetched by instruction fetcher 212. Instruction buffer 230 receives the decoded instructions from instruction decoder 220. Instruction buffer 230 comprises memory locations for a plurality of instructions. Instruction buffer 230 may reorder the order of execution of instructions received from instruction decoder 220. Instruction buffer 230 therefore comprises an instruction queue to provide an order in which instructions are sent to a dispatch unit 240.

Dispatch unit 240 dispatches communications processing instructions received from instruction buffer 230 to execution units 250. In a superscalar architecture, execution units 250 may comprise load/store units, integer Arithmetic/Logic Units, floating point Arithmetic/Logic Units, and Graphical Logic Units, all operating in parallel. Dispatch unit 240 therefore dispatches instructions to some or all of the executions units to execute the instructions simultaneously. Execution units 250 comprise stages to perform steps in the execution of instructions received from dispatch unit 240. Data processed by execution units 250 are storable in and accessible from integer register files and floating point register files not shown. Thus, instructions are executed sequentially and in parallel.

FIG. 2 shows a first execution unit (XU1) 270 and a second execution unit (XU2) 280 of a processor with a plurality of execution units. Each stage of each of execution units 250 is capable of performing a step in the execution of a different communications processing instruction. In each cycle of operation of processor 200, execution of an instruction progresses to the next stage through the processor pipeline within execution units 250. Those skilled in the art will recognize that the stages of a processor "pipeline" may include other stages and circuitry not shown in FIG. 2

Moreover, by multi-thread processing, multiple software update processes may run concurrently. For example, by executing instructions of different threads, the processor executes load/store instructions while also performing an exclusive-or of data. The processor may therefore be loading a word of key file data and loading a word of scrambled file data while at the same time performing the exclusive or of two different words of key file and scrambled file data. Moreover, while the system performs the exclusive-or of two words of data, the system may also simultaneously store a result of a previous exclusive-or operation on two other words of data. Thus, a plurality of instructions may be executed in sequence and in parallel to perform encrypted software update functions.

FIG. 2 also shows control circuitry 260 to perform a variety of functions that control the operation of processor 200. For example, an operation controller within control circuitry 260 interprets the OPCode contained in an instruction and directs the appropriate execution unit to perform the indicated operation. Also, control circuitry 260 may comprise a branch redirect unit to redirect instruction fetcher 212 when a branch is determined to have been mispredicted. Control circuitry 260 may further comprise a flush controller to flush instructions younger than a mispredicted branch instruction.

Branches may arise from performing a plurality of encrypted software update functions. For example, during descrambling, the processor may also be instructed to perform a comparison of unscrambled data to data loaded into a processor register from L1 cache. This may be done for error checking, for example. If an error is detected, a branch instruction may cause the processor to cease performing exclusive-or operations on the data. That is, descrambling ceases. If no error is detected, then descrambling continues. Control logic for executing branch instructions is thus provided by control circuitry 260.

Figure 3:
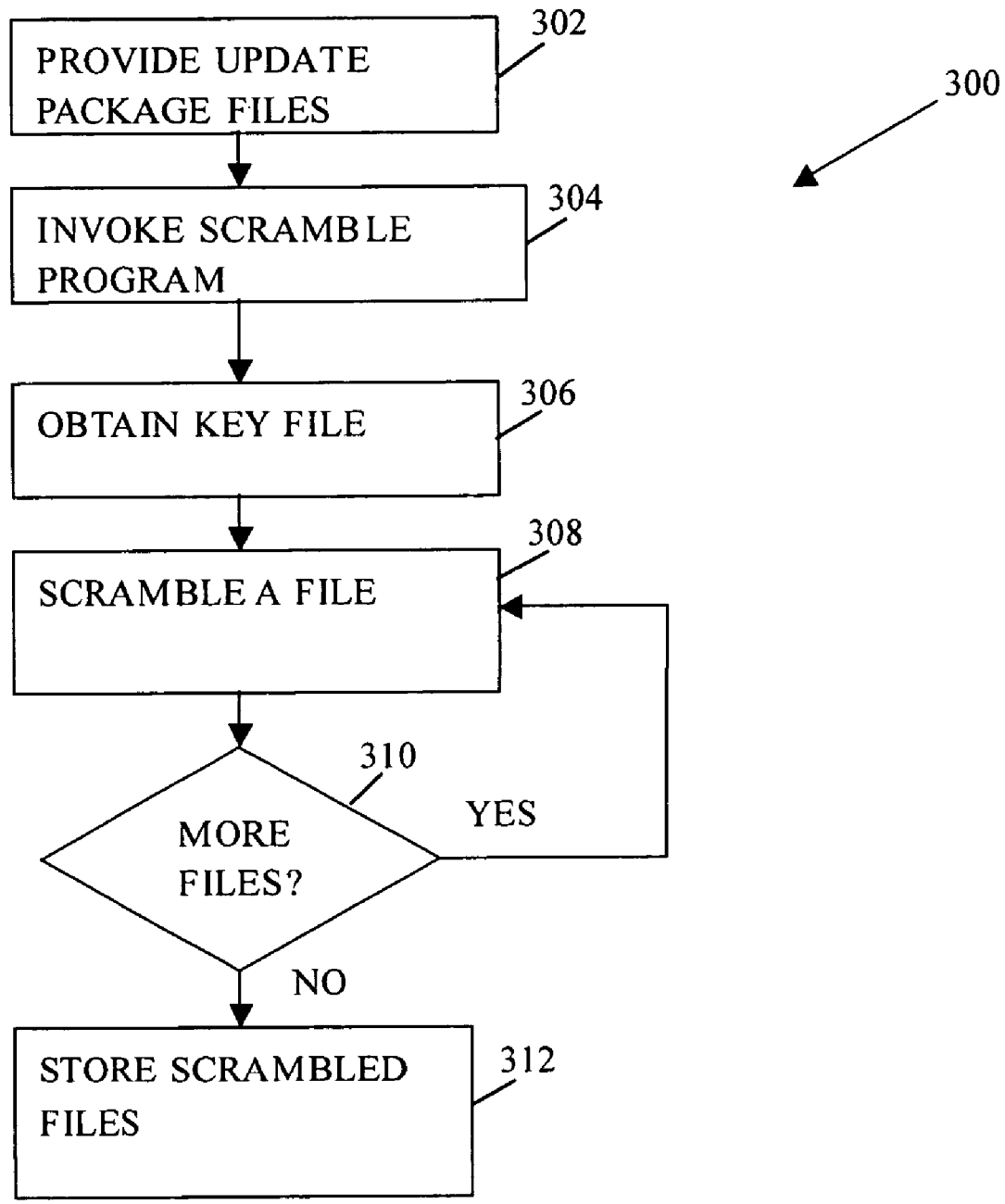
FIG. 3 depicts a flowchart of an embodiment for scrambling files of an update package.

FIG. 3 shows a flow chart 300 of an embodiment of an encrypting process performed by the processor of computer 1008. Occasionally, a software developer will develop changes to the original software files, or changes to files since the last update. The changed files are aggregated together into an update package which contains all the updated files. In some embodiments, the unchanged files are also contained in the update package of files. This is the case for RPM for the Linux operating system. The updated files in the update package of files replace the files that are either original or previously updated. In the case of RPM, the original files that have not changed are nevertheless replaced by the corresponding files in the update package. The update package of files is provided on the computer or server from which the update is to be obtained (element 302).

An update manager, a human being, invokes a program to perform an encryption or scrambling of the update files in the update package (element 304). The scramble program is executed by a processor as described above. The scramble program will obtain key file data from system memory (element 306). The key file data is from the key file. The key file is a file that is unchanged and is contained in the original software package. The user who has the original or previously updated software installed on his or her computer, will have a copy of the key file. The scramble program mixes the key file data with a file of the update package of files to scramble the file (element 308). The mixing can be implemented as an exclusive-or operation to exclusive-or each word of the key file with a word of the file to be scrambled. When the scrambling of a file is complete, the system checks to see if any more files are in the update package that have not yet been scrambled (element 310). If more files are to be scrambled, the system scrambles another file in the update package (element 308). If not, the system stores all the scrambled files in a scrambled package in system memory (element 312).

Figure 4:
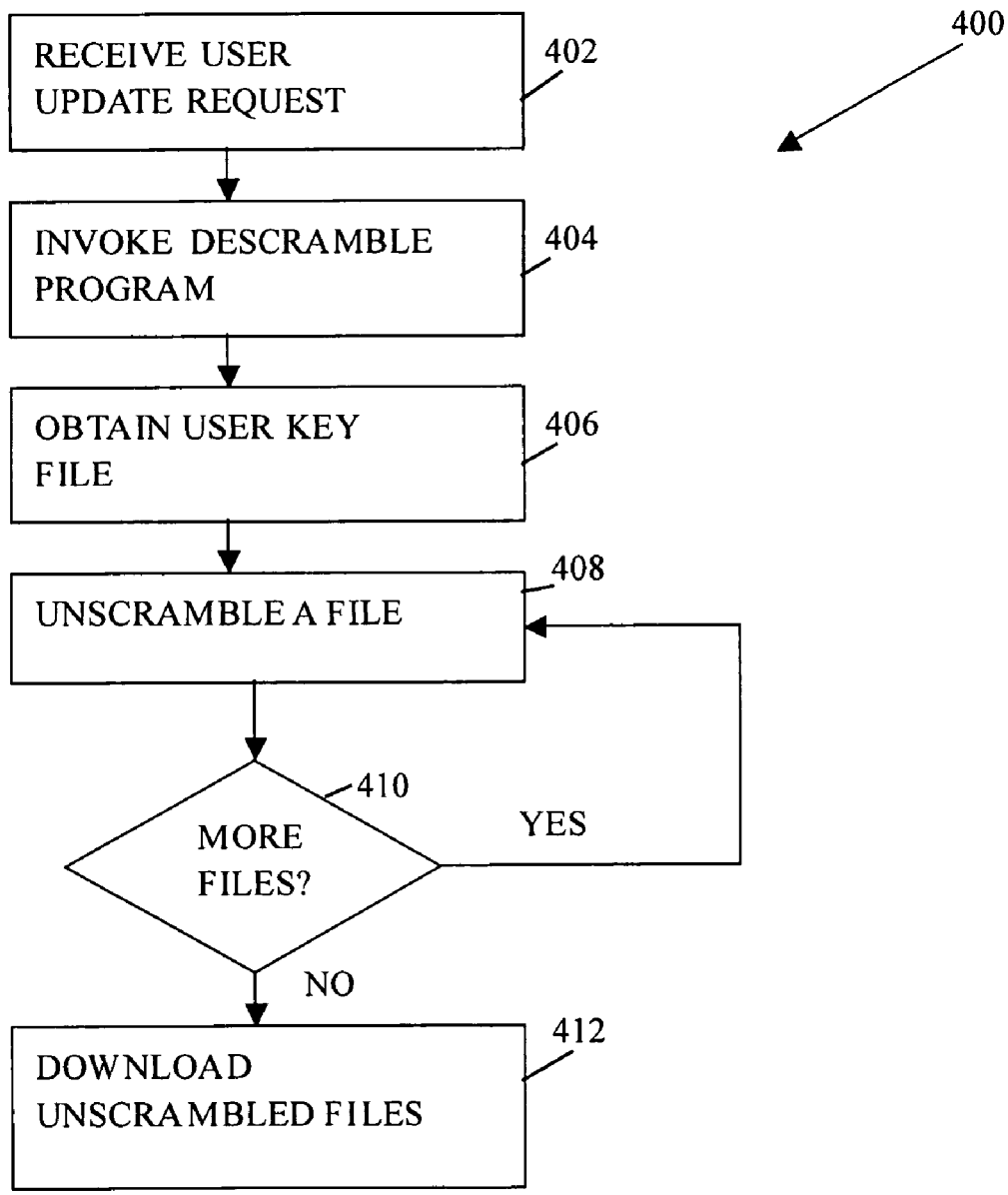
FIG. 4 depicts a flowchart of an embodiment for unscrambling files of an update package.

FIG. 4 shows a flow chart 400 of an embodiment for decrypting software update files. Typically, a software developer will maintain a website where updates to software may be downloaded. The user who desires an update will use a web explorer program to display the website pages. The user will click on a download button, or similar mechanism, to initiate a download. This sends a user request for a download to the computer or server holding the scrambled files. When the computer or server containing the scrambled files for the update receives a user request for a download (element 402), it automatically invokes a descrambling program (element 404. In one embodiment, the descramble program is executed by a processor in the computer or server, as described above. In another embodiment, also as described above, a processor in the user's computer executes the descramble program.

The system executing the descramble program will obtain the user's copy of the key file (element 406). The user's copy of the key file is used to unscramble a file in the scrambled update package (element 408). When the unscrambling of a file is complete, the system determines if any more files exist to be descrambled (element 410). If more files are to be descrambled, the system descrambles a next file in the package of scrambled files (element 408). When all files have been descrambled, the unscrambled files are downloaded (element 412) and stored on the user's computer system memory. Note that the system will only successfully decrypt the encrypted update package if the key file supplied by the user's computer is the same as the copy of the key file used to encrypt the update package.

Some embodiments of the invention are implemented as a program product for use with a computer system such as, for example, the system 116 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing in a data processing system, to cause the system to perform a series of operations for updating a computer program. The operations comprise receiving data of an encrypted update package of files that has been encrypted using a copy of a key file contained in an original version of the computer program. The operations further comprise decrypting the encrypted update package of files using a user-provided key file in response to a user request for an update.

In one embodiment, an unencrypted update package of files is encrypted by performing an exclusive-or operation between data of the copy of the key file contained in an original version of the computer program and data of the unencrypted update package of files. The decrypting operation comprises performing an exclusive-or operation between data of the user-provided key file and data of the encrypted update package of files. In some embodiments, the operations may further comprise comparing the user-provided key file to the key file contained in the original version of the computer program. In some embodiments, the operations may further comprise evaluating data indicative of error.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding described herein may be utilized according to the present invention. Accordingly, the appended claims are intended to include within their scope such processes, machines, manufacture, compositions of matter, means, methods, or steps.

What is claimed is:

1. A method for securely providing an update for a computer program, comprising:
    aggregating an updated version of the computer program by compiling a set of files of the updated version of the computer program using a processor, the set of files to comprise at least changed files with respect to an existing installation of the computer program to replace the existing installation of the computer program;
    selecting a file of the computer program that is contained in the existing installation of the computer program as a key file using the processor; and
    generating a scrambled version by encrypting the updated version using the key file and the processor after selecting the key file for distribution to a computer with the existing installation of the computer program.

2. The method of claim 1, further comprising packaging the scrambled version with data for evaluation of the scrambled version for errors.

3. The method of claim 2, wherein the data for evaluation of the scrambled version for errors comprises parity data.

4. The method of claim 1, further comprising packaging the scrambled version with a descramble program, the descramble program to generate a copy of the updated version from the scrambled version if a user-copy of the key file matches the key file.

5. The method of claim 4, wherein packaging the scrambled version with the descramble program comprises packaging the scrambled version with the descramble program to verify the existence of the user-copy of the key file that matches the key file in the existing installation of the computer program.

6. The method of claim 1, further comprising decrypting the scrambled version using a user-copy of the key file from the existing installation that corresponds to the key file by performing an exclusive-or operation between data of the user-copy of the key file and data of the scrambled version.

7. The method of claim 1, wherein generating the scrambled version comprises encrypting by performing an exclusive-or operation between data of the key file and data of the updated version.

8. An apparatus for securely providing an update for a computer program, comprising:
    memory and
    a processor coupled with the memory to aggregate an updated version of the computer program by compiling a set of files of the updated version of the computer program, the set of files to comprise at least changed files with respect to an existing installation of the computer program to replace the existing installation of the computer program; to select a file of the computer program that is contained in the existing installation of the computer program as a key file and to generate a scrambled version by encrypting the updated version using the key file after selecting the key file for distribution to a computer with the existing installation of the computer program.

9. The apparatus of claim 8, wherein the processor is coupled with the memory to compare the key file to a user-copy of the key file from the existing installation of the computer program.

10. The apparatus of claim 8, wherein the processor is coupled with the memory to execute instructions for decrypting the scrambled version in response to receipt of a user-copy of the key file and data of the encrypted update package.

11. The apparatus of claim 10, wherein the processor is coupled with the memory to execute instructions for decrypting the scrambled version to decrypt the scrambled version at a site that is remote from the existing installation of the computer program.

12. The apparatus of claim 10, wherein the processor is coupled with the memory to execute instructions for decrypting the scrambled version to decrypt the scrambled version at a site that is local to the existing installation of the computer program.

13. The apparatus of claim 10, wherein the processor is coupled with the memory to execute instructions to evaluate data indicative of error.

14. A machine-accessible tangible storage medium, wherein the medium is not a signal, containing instructions for updating a computer program, which, when the instructions are executed by a machine, cause said machine to perform operations for securely providing an update for a computer program, the operations comprising:
   aggregating an updated version of the computer program by compiling a set of files of the updated version of the computer program, the set of files to comprise at least changed files with respect to an existing installation of the computer program to replace the existing installation of the computer program;
   selecting a file of the computer program that is contained in the existing installation of the computer program as a key file;
   and generating a scrambled version by encrypting the updated version using the key file after selecting the key file for distribution to a computer with the existing installation of the computer program.

15. The machine accessible medium of claim 14, wherein the operations further comprise packaging the scrambled version with data for evaluation of the scrambled version for errors.

16. The machine accessible medium of claim 15, wherein the data for evaluation of the scrambled version for errors comprises parity data.

17. The machine accessible medium of claim 14, wherein the operations further comprise packaging the scrambled version with a descramble program, the descramble program to generate a copy of the updated version from the scrambled version if a user-copy of the key file matches the key file.

18. The machine accessible medium of claim 17, wherein packaging the scrambled version with the descramble program comprises packaging the scrambled version with the descramble program to verify the existence of the user-copy of the key file that matches the key file in the existing installation of the computer program.

19. The machine accessible medium of claim 14, wherein the operations further comprise decrypting the scrambled version using a user-copy of the key file from the existing installation that corresponds to the key file by performing an exclusive-or operation between data of the user-copy of the key file and data of the scrambled version.

20. The machine accessible medium of claim 14, wherein generating the scrambled version comprises encrypting by performing an exclusive-or operation between data of the key file and data of the updated version.

\* \* \* \* \*